(12) United States Patent
Teratani

(10) Patent No.: US 8,446,543 B2
(45) Date of Patent: May 21, 2013

(54) CHASSIS ASSEMBLY FOR DISPLAY APPARATUS

(75) Inventor: Kazumi Teratani, Osaka (JP)

(73) Assignee: Panasonic Corporation, Osaka (JP)

( * ) Notice: Subject to any disclaimer, the term of this patent is extended or adjusted under 35 U.S.C. 154(b) by 483 days.

(21) Appl. No.: 12/685,176

(22) Filed: Jan. 11, 2010

(65) Prior Publication Data

US 2010/0182531 A1 Jul. 22, 2010

(30) Foreign Application Priority Data

Jan. 20, 2009 (JP) ................................. 2009-009497
Nov. 12, 2009 (JP) ................................. 2009-258458

(51) Int. Cl.
G02F 1/1333 (2006.01)

(52) U.S. Cl.
USPC .................................. 349/60; 349/58; 349/59

(58) Field of Classification Search
USPC .................................................... 349/58–60
See application file for complete search history.

(56) References Cited

U.S. PATENT DOCUMENTS

| 2003/0122993 A1* | 7/2003 | Eiraku et al. ..................... 349/58 |
| 2004/0246397 A1* | 12/2004 | Kang et al. ....................... 349/58 |
| 2009/0237586 A1* | 9/2009 | Han et al. ......................... 349/58 |

FOREIGN PATENT DOCUMENTS

| JP | 08-236950 | 9/1996 |
| JP | 2006-308490 | 11/2006 |

* cited by examiner

*Primary Examiner* — Phu Vu
(74) *Attorney, Agent, or Firm* — Hamre, Schumann, Mueller & Larson, P.C.

(57) ABSTRACT

Supporting metal plates 121 are attached to the sides of a display 101, so that screwing flat portions 123 of the supporting metal plates 121 are placed out of the back side of the display 101. Further, a lid 151, fixing brackets 141, and the screwing flat portions 123 are fixed with screws in a state in which fixing flat portions 143 of the fixing brackets 141 are inserted into long grooves 112 on the side walls of a body case, thereby reducing clearances between the display 101 and the side walls of the body case. Thus with the simple chassis configuration having only the long grooves 112 formed on the body case 111, a chassis can be constructed detachably with a chassis peripheral part having a small width.

8 Claims, 6 Drawing Sheets

CHASSIS ASSEMBLY FOR DISPLAY APPARATUS

FIELD OF THE INVENTION

The present invention relates to a chassis assembly for a display apparatus, the chassis assembly storing a display such as a liquid crystal display.

BACKGROUND OF THE INVENTION

In recent years, display apparatuses such as a liquid crystal television and a PC monitor have been increased in size, high quality images such as a high definition image have been increased further in width with an aspect ratio of, for example, 9:16, and display apparatuses have been requested to display large images without an undue increase in width. For this reason, a chassis assembly for a display apparatus has been devised such that a fixing part for fixing a display such as a liquid crystal display is reduced in size and a part surrounding the display in the chassis of the display apparatus (hereinafter, will be referred to as a chassis peripheral part) is reduced in width, particularly the width of the chassis peripheral part on a side of the display.

For example, claws are provided on one of the chassis and the display, through holes are provided on the other of the chassis and the display, the chassis is attached to the display so as to insert the claws into the through holes, and the display and the chassis are fixed such that the claws are prevented from being detached from the through holes by the tips of the claws.

Further, in some cases, a display and a chassis are fixed by inserting a fixing block from a side of the chassis as shown in FIG. 6.

FIG. 6 shows a chassis assembly for a display apparatus according to the prior art.

In FIG. 6, arrow B indicates the lateral direction of the display apparatus and arrow C indicates the thickness direction. A side wall hole 212 is provided on a side wall of a body case 211 forming the chassis and a fixing portion 232 is provided on the back side of the screw fixing portion of a lid 231. A liquid crystal display 201 is fixed temporarily at a predetermined position of the body case 211, a fixing block 221 having a screw hole 222 is inserted from the side wall hole 212 provided on the body case 211, and the lid 231 and the fixing block 221 are fastened with a screw 241, so that the liquid crystal display 201 is held between the body case 211 and the fixing block 221. As a result, an installation space for assembly is not necessary on a side of the body case 211, the side serving as a chassis peripheral part on a side of the display. Thus the chassis peripheral part of the display apparatus is reduced in width.

DISCLOSURE OF THE INVENTION

However, in a configuration where a chassis and a display are fixed using claws according to the prior art, once the claws are inserted into through holes, the claws cannot be removed from the through holes without breaking the claws or the through holes, disadvantageously making it difficult to attach and detach the display for repair and so on.

Generally, a chassis is molded using a die. Thus disadvantageously in a configuration using a fixing block, a chassis assembly becomes complicated and the number of components increases. In other words, in order to provide the side wall hole 212 on the side wall of the body case 211, it is necessary to form the side wall hole 212 concurrently with the formation of the outside shape of the body case 211. Thus it is necessary further to provide a block for forming the side wall hole 212 by laterally sliding the inside of a die during die molding. For these processes, a complicated and expensive die and molding process are necessary. Further, many components such as the fixing portion 232 of the lid 231 and the fixing block 221 are necessary for each screwing point.

A chassis assembly for a display apparatus according to the present invention has been devised in view of the foregoing problems. An object of the present invention is to configure a chassis including a chassis peripheral part having a small width with a simple configuration while enabling the chassis to be attached and detached.

In order to attain the object, a chassis assembly for a display apparatus according to the present invention includes: a body case having long grooves formed on the rear ends of the side walls of the body case; a lid detachably fixed to the rear ends of the side walls of the body case; supporting metal plates attached to the sides of a display; screwing flat portions provided on the supporting metal plates and protruded along the back side of the display; fixing brackets having fixing flat portions inserted into the long grooves; and a display fixing screw for integrally fixing the lid, the fixing bracket, and the screwing flat portion.

Further, a chassis assembly for a display apparatus according to the present invention includes: a body case having long grooves formed on the rear ends of the lateral side walls of the body case; a lid detachably fixed to the rear ends of the side walls of the body case; supporting metal plates attached to the lateral sides of a display; screwing flat portions provided on the supporting metal plates and protruded along the back side of the display; fixing brackets having fixing flat portions inserted into the long grooves; and a display fixing screw for integrally fixing the lid, the fixing bracket, and the screwing flat portion.

It is preferable that the long groove has a depth direction substantially corresponding with the vertical direction relative to the display surface of the display.

Moreover, it is preferable that the fixing bracket further includes another supporting flat portion formed to position the supporting metal plate, at a position opposed to the fixing flat portion of the fixing bracket.

Further, it is preferable that the fixing flat portion further includes protrusions on a surface of the fixing flat portion.

Moreover, the side wall of the body case on which the long groove is formed may include steps.

Further, the body case and the lid may be fixed with a chassis fixing screw.

DESCRIPTION OF THE EMBODIMENT (First Embodiment)

A chassis assembly for a display apparatus according to a first embodiment is made up of a body case and a lid that form the outside shape of a chassis, supporting metal plates attached to the sides of a display, and fixing brackets for fixing the supporting metal plates and the chassis. The supporting metal plate has screwing flat portions protruding to the back side of the display and screw holes provided on the screwing flat portions. Long grooves are formed on the back side of the side walls of the body case (hereinafter, will be referred to as the rear ends of the side walls), and the fixing bracket has a fixing flat portion formed by bending an end of the fixing bracket relative to the short side direction and a screw hole. After that, the display having the supporting metal plates attached thereon is fixed temporarily to the body case. The fixing flat portions of the fixing brackets are inserted into the long grooves of the body case, the lid and the body case are detachably fixed to each other, and the supporting metal plates, the fixing brackets, and the lid are integrally fixed with screws. Thus the display can be firmly fixed in the chassis and the lid and the display can be detachably fixed on the back side of the display via the supporting metal plates and the fixing brackets. Thus it is possible to minimize a clearance between the display and the side wall of the body case to detachably configure the chassis including a chassis peripheral part having a small thickness with a simple configuration.

Referring to FIGS. 1 and 2 to 5, the first embodiment will be described below.

Figure 1A:
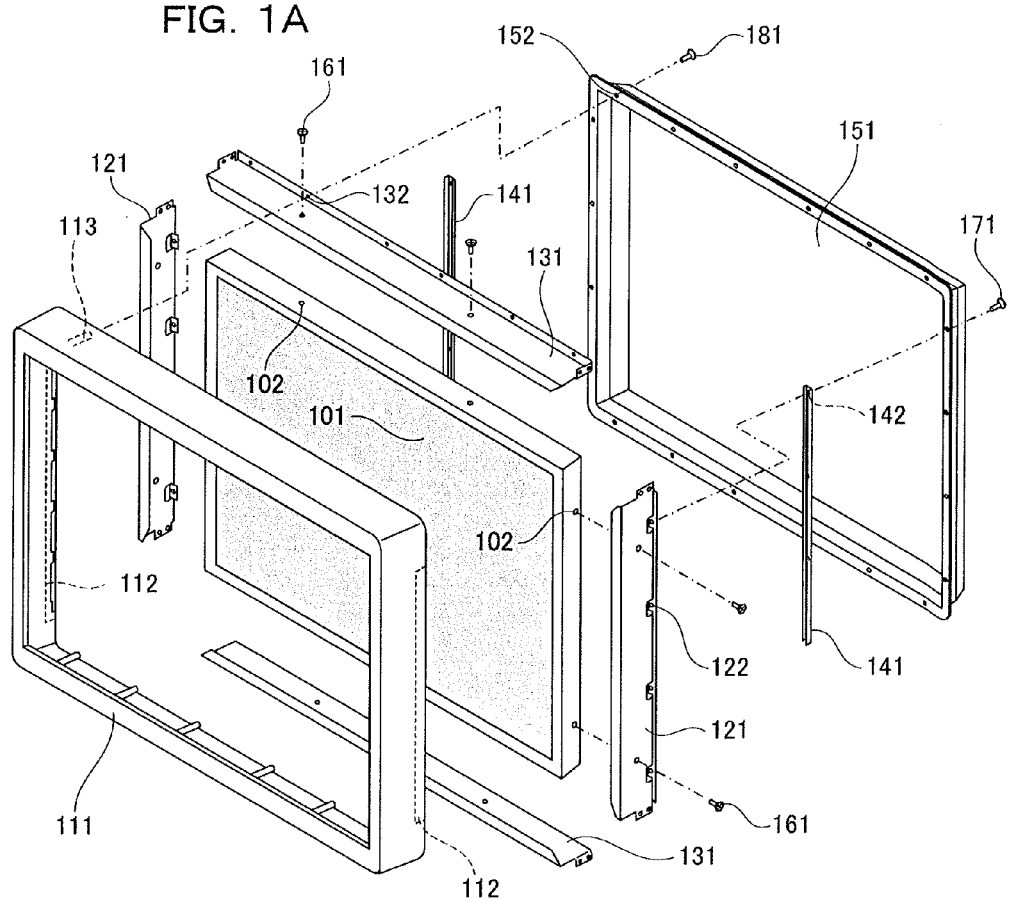
FIG. 1A is an exploded perspective view for explaining the configuration of a chassis assembly for a display apparatus according to a first embodiment.
Figure 1B:
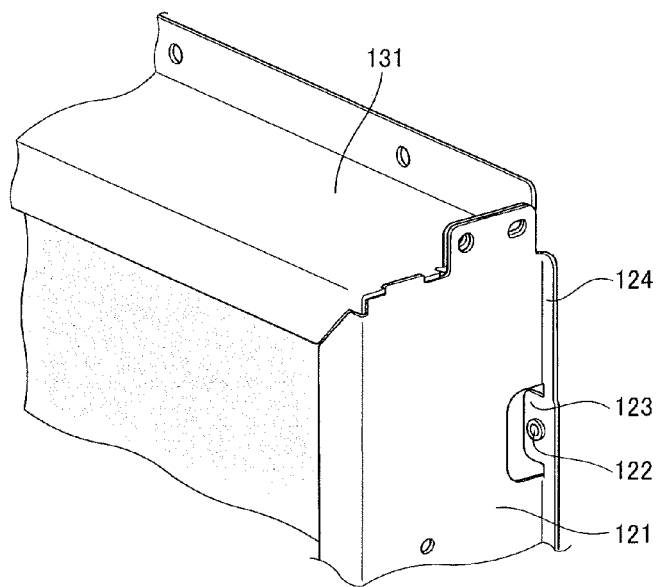
FIG. 1B is a main part enlarged view showing the fixing portion of a vertically supporting metal plate and a laterally supporting metal plate according to the first embodiment.
Figure 2:
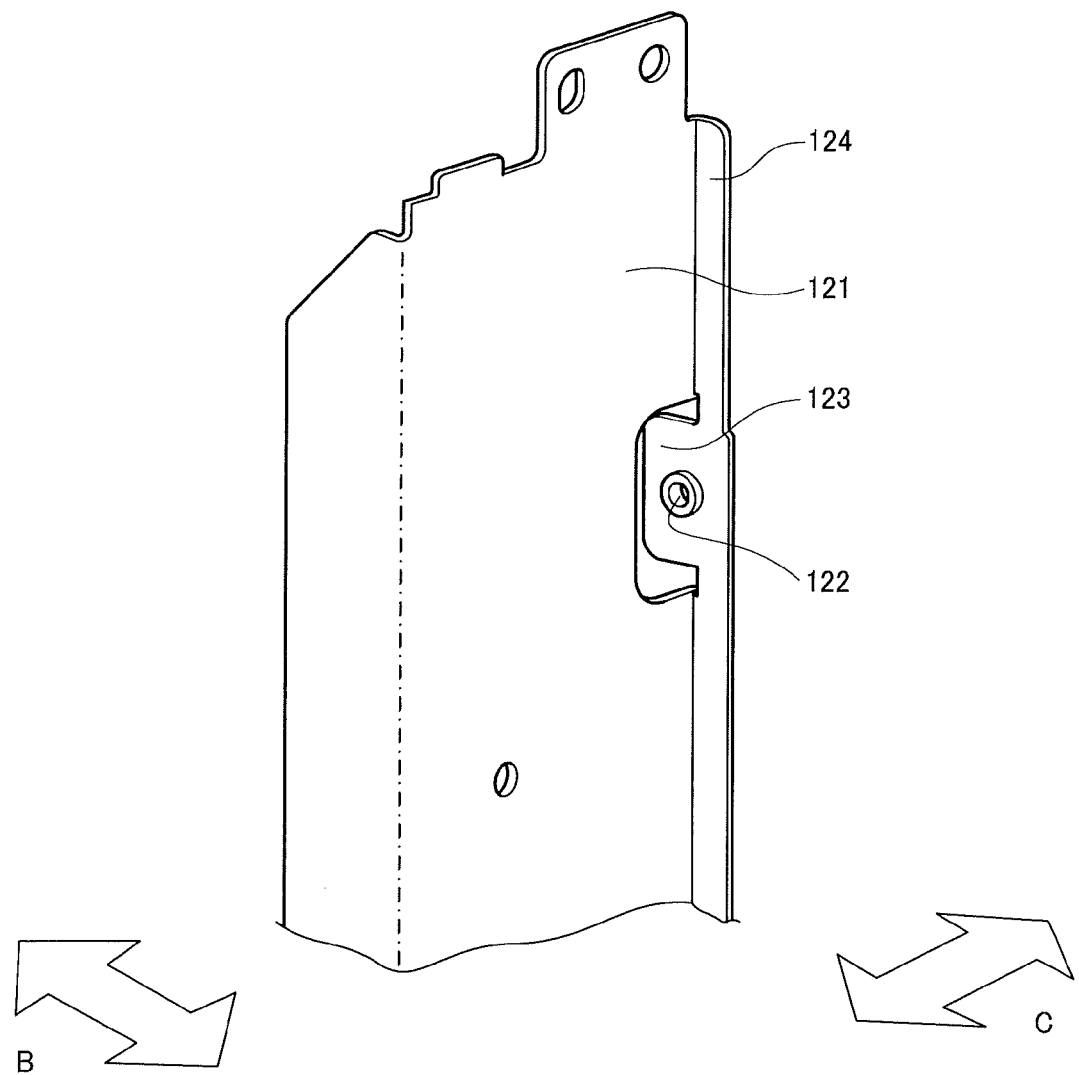
FIG. 2 is a main part perspective view showing the configuration of the supporting metal plate in the chassis assembly for the display apparatus according to the first embodiment.
Figure 3A:
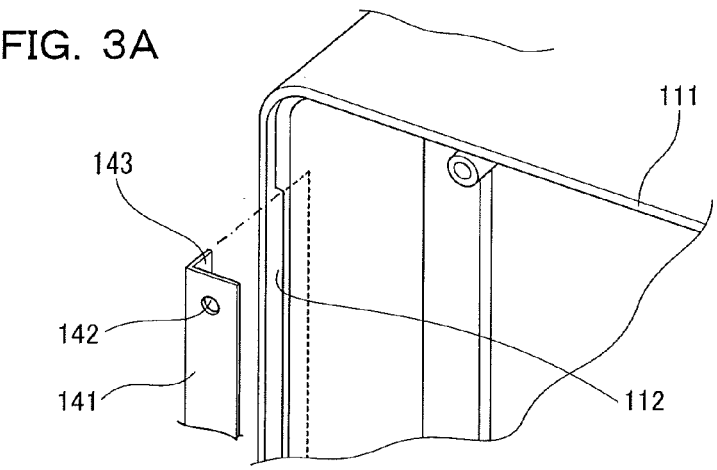
FIG. 3A is a main part perspective view showing the configuration of a fixing bracket in the chassis assembly for the display apparatus according to the first embodiment.
Figure 3B:
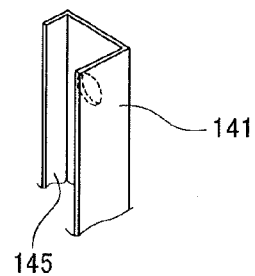
FIG. 3B is a main part perspective view showing the configuration of the fixing bracket in the chassis assembly for the display apparatus according to the first embodiment.
Figure 3C:
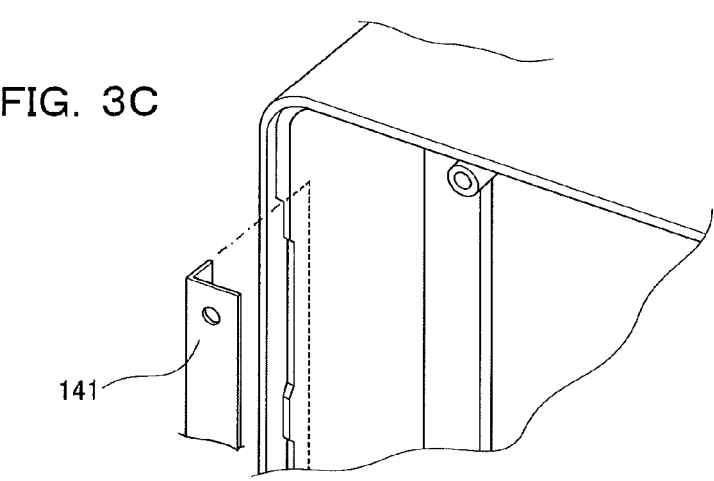
FIG. 3C is a main part perspective view showing the configuration of the fixing bracket in the chassis assembly for the display apparatus according to the first embodiment.
Figure 3D:
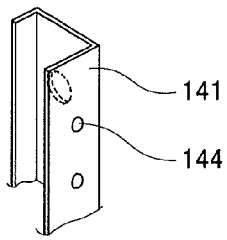
FIG. 3D is a main part perspective view showing the configuration of the fixing bracket in the chassis assembly for the display apparatus according to the first embodiment.
Figure 4A:
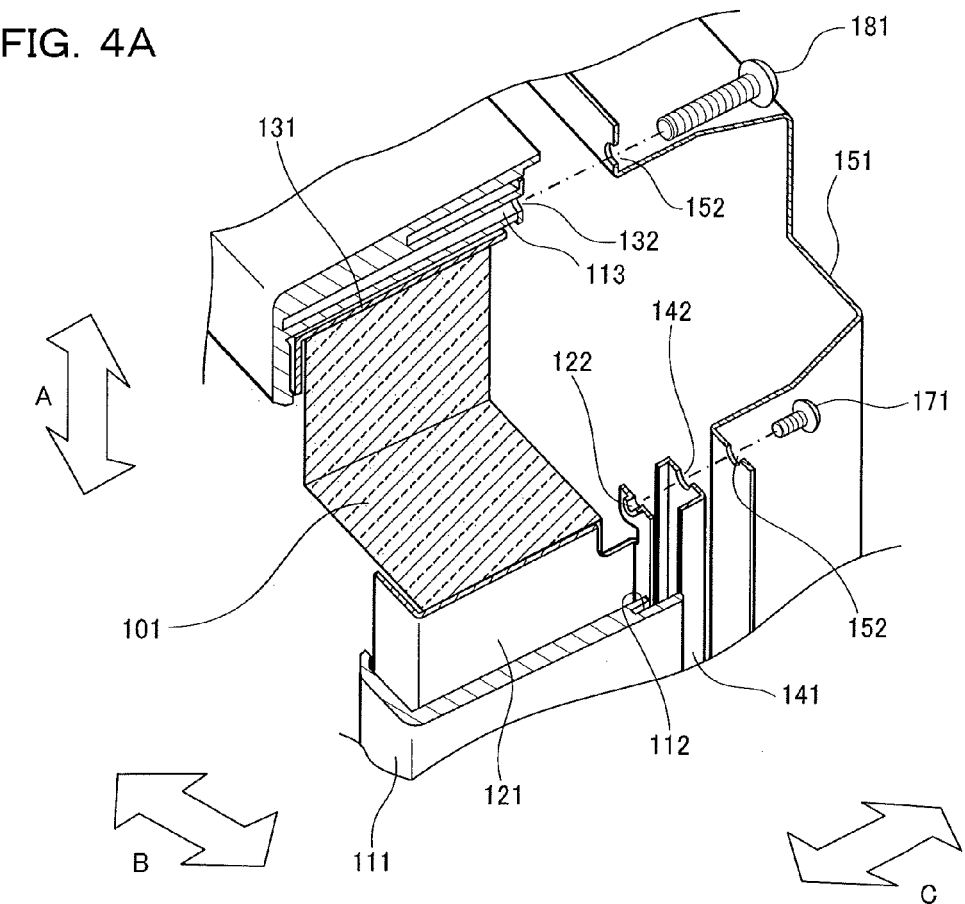
FIG. 4A shows the chassis assembly of an upper frame and a right frame of the display apparatus in the chassis assembly for the display apparatus according to the first embodiment.
Figure 4B:
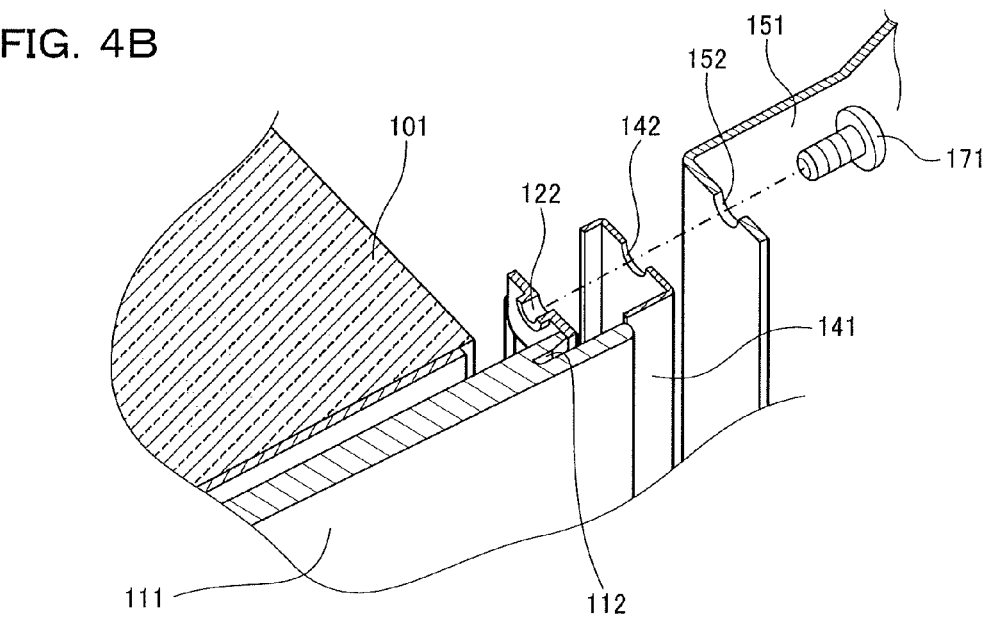
FIG. 4B shows the chassis assembly of the upper frame and the right frame of the display apparatus in the chassis assembly for the display apparatus according to the first embodiment.
Figure 5:
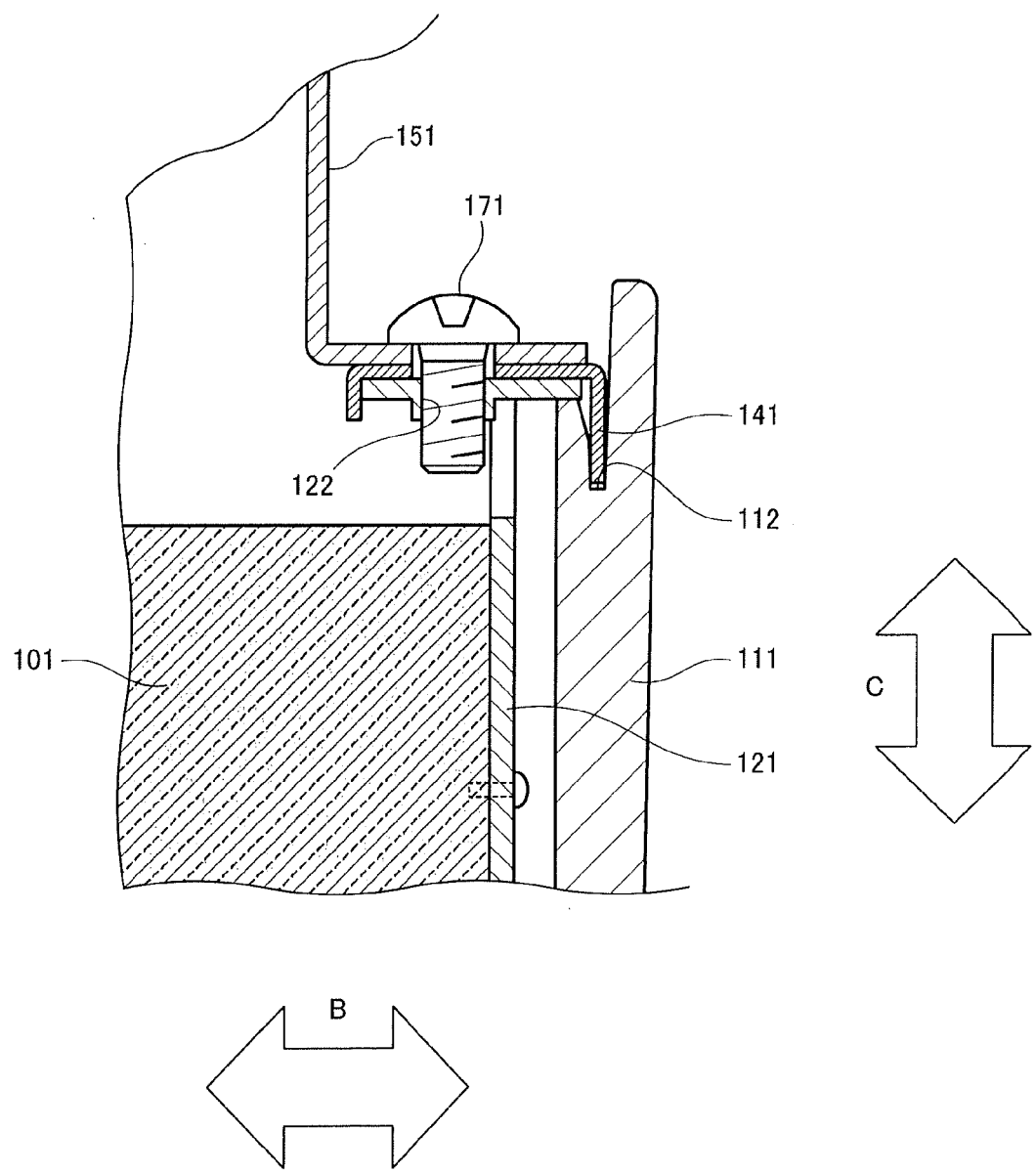
FIG. 5 is a sectional enlarged view showing the right frame of the display apparatus in the horizontal direction in the chassis assembly for the display apparatus according to the first embodiment.
Figure 6:
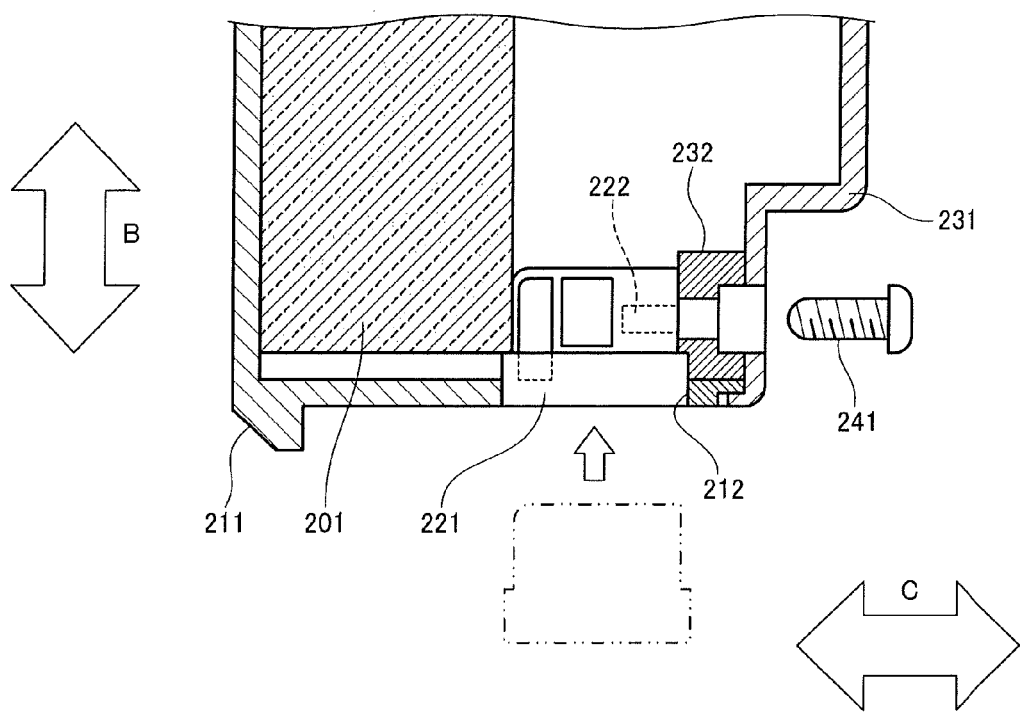
FIG. 6 shows a chassis assembly for a display apparatus according to the prior art.

FIG. 1A is an exploded perspective view for explaining the configuration of a chassis assembly for a display apparatus according to the first embodiment. FIG. 1B is a main part enlarged view showing the fixing portion of a vertically supporting metal plate and a laterally supporting metal plate according to the first embodiment. FIG. 2 is a main part perspective view showing the configuration of the supporting metal plate in the chassis assembly for the display apparatus according to the first embodiment and is a detail perspective view of a laterally supporting metal plate 121 located on the right side of the display apparatus. FIGS. 3A to 3D are main part perspective views showing the configuration of a fixing bracket in the chassis assembly for the display apparatus according to the first embodiment. FIG. 3A shows the configuration of the fixing bracket and a state in which the fixing bracket is inserted into a long groove 112 of a body case 111. FIGS. 3B and 3D show the structural examples of the fixing bracket. FIG. 3C illustrates the shape of the side wall of the body case 111 in which the long groove 112 is formed. FIGS. 4A and 4B show the chassis assembly of the upper frame and the right frame of the display apparatus in the chassis assembly for the display apparatus according to the first embodiment. FIG. 4A is a partial sectional perspective view and FIG. 4B is a main part enlarged view. FIGS. 4A and 4B are perspective views partially showing the chassis assembly. FIG. 5 is a sectional enlarged view showing the right frame of the display apparatus in the horizontal direction in the chassis assembly for the display apparatus according to the first embodiment. In this configuration, a lower frame is symmetrical with the upper frame and a left frame is symmetrical with the right frame with respect to the display.

In the following drawings, arrow A indicates the vertical direction of the display apparatus, arrow B indicates the lateral direction of the display apparatus, and arrow C indicates the thickness direction of the display apparatus. The lateral direction is a direction when the display apparatus is viewed from the front.

Referring to FIG. 2, the laterally supporting metal plate 121 first will be described below. The laterally supporting metal plate 121 is produced by pressing a rectangular metal sheet. The front end of the laterally supporting metal plate 121 relative to the short side direction has a bent end face that is bent inward (to the left). Near the rear end of the laterally supporting metal plate 121 relative to the short side direction, U-shaped notches opened to the rear are provided at a plurality of points in the vertical direction and the notches are bent to the outside (to the right) with the rear ends of the notches serving as bending positions. As a result, the rear end of the laterally supporting metal plate 121 has the bent end face 124, which is bent to the outside, and screwing flat portions 123 that protrude to the inside on the same plane as the bent end face 124. The screwing flat portion 123 has a screw hole 122. The screw holes 122 are placed inside the lateral end face of a display 101 when the laterally supporting metal plate 121 is attached to the display 101, as will be described later. The foregoing explanation described the laterally supporting metal plate 121 on the right side. The laterally supporting metal plate 121 on the left side is configured similarly except that the laterally supporting metal plate 121 on the left side is symmetrical with the laterally supporting metal plate 121 on the right side.

The following will describe vertically supporting metal plates 131. The front end of the upper vertically supporting metal plate 131 relative to the short side direction has a bent end face that is bent inward (downward). Further, the rear end of the vertically supporting metal plate 131 relative to the short side direction has a bent end face that is bent outward (upward). On the bent end face of the rear end, a plurality of screw holes 132 are provided. The lower vertically supporting metal plate 131 is configured similarly except that the lower vertically supporting metal plate 131 is symmetrical with the upper vertically supporting metal plate 131.

The body case 111 constitutes the front face and side parts on the top, bottom, right, and left of the chassis of a liquid crystal display apparatus. The front face has a part opposed to the display 101 and the part is opened except for a frame part.

The laterally supporting metal plates 121 having the screw holes 122 on the bent end faces of the rear ends and the vertically supporting metal plates 131 having the screw holes 132 on the bent end faces of the rear ends are contacted along the side parts of the display 101 such as a liquid crystal panel, a PDP, and an organic EL panel, and then the metal plates are each fastened to screw holes 102 of the display 101 with screws 161 and are stored in the body case 111. As shown in FIG. 1B, the laterally supporting metal plate 121 and the vertically supporting metal plate 131 are fastened firmly with the screws (not shown) on the ends relative to the long side direction (near the four corners of the display 101).

Referring to FIGS. 3A and 3B, the configuration of a fixing bracket 141 will be described below.

As shown in FIG. 3A, the fixing bracket 141 has a fixing flat portion 143 formed by bending the outer side of the fixing bracket 141 to the front relative to the display 101, and a screw hole 142 used for fixing to a lid 151. When the display 101 is fixed, the fixing flat portion 143 is inserted to the long groove 112 of the body case 111.

As shown in FIG. 3B, a side opposed to the fixing flat portion 143 also may be bent to the front to provide a supporting flat portion 145, so that the supporting metal plate 121 can be more easily held.

As shown in FIG. 3C, steps may be formed on a side wall of the body case 111 where the long groove 112 is formed. The body case 111 is molded using a die and the die easily may be broken when the long groove 112 is rectangular. Thus as shown in FIG. 3C, the strength of the die can be secured by forming steps on the side wall with varying heights relative to the thickness direction.

Further, as shown in FIG. 3D, convex portions 144 may be provided on the fixing flat portion 143, so that the inner wall of the long groove 112 can be supported by the ends of the convex portions 144 in a state in which the fixing flat portion 143 easily can be inserted into the long groove 112. Thus wobbling can be prevented. The convex portions 144 are desirably dome-shaped to facilitate the insertion and may be provided at least on one of the inner surface and the outer surface of the fixing flat portion 143.

The following will describe the dimensions of the fixing bracket 141 and the long groove 112 when the display apparatus is a 26-inch panel. When the display apparatus is a 26-inch panel, it is preferable that the fixing bracket 141 is 0.6 mm in thickness, the fixing flat portion 143 is 5.0 mm in length in the insertion direction, and the convex portions 144 are, when provided, about 0.4 mm in height. Further, it is preferable that the long groove 112 is 4.3 mm in depth and 0.8 mm in width and the body case 111 is 1.6 mm in thickness inside the long groove 112. Moreover, in order to facilitate the insertion of the fixing flat portion 143, a taper is preferably formed at the entrance of the long groove 112 so as to increase the width of the insertion side.

In the first embodiment, the foregoing fixing bracket 141 can be used. The following will describe an example in which the fixing bracket 141 of FIG. 3B is used.

Referring to FIGS. 4A, 4B, and 5, the configuration of the chassis assembly according to the first embodiment will be described below. In the following explanation, a configuration on the right side or the upper side will be described as an example.

In FIGS. 4A and 4B, the long groove 112 is formed on the rear end of the right side wall of the body case 111. The long groove 112 is provided vertically along the rear end of the right side wall, the depth direction of the long groove 112 substantially corresponds with the thickness direction of the display apparatus, and the long groove 112 has a depth formed substantially in the vertical direction relative to the display surface of the display 101. The depth direction of the long groove 112 is substantially perpendicular to the display surface of the display 101, so that the long groove 112 can be formed easily when the die of the body case ill is formed. Inside the upper wall of the body case 111, a plurality of screw holes 113 are formed integrally.

The lid 151 forms the back panel of the liquid crystal display apparatus. On the lid 151, a plurality of screw holes 152 are formed at positions corresponding to the screw holes 122 of the laterally supporting metal plate 121 and the screw holes 132 of the vertically supporting metal plate 131.

First, the chassis assembly of the upper frame will be described below. The display 101 on which the laterally supporting metal plates 121 and the vertically supporting metal plates 131 are fastened with the screws is fixed temporarily in a position where the screw holes 132 of the vertically supporting metal plate 131 come into contact with the screw holes 113 of the body case 111. Screws 181 penetrate the screw holes 152 of the lid 151 and the screw holes 132 of the vertically supporting metal plate 131 and are screwed into the screw holes 113 of the body case 111, so that the display 101 is held by the body case 111 and the lid 151. In this configuration, the screw holes 113 are provided between the body case 111 and the display 101, and the vertically supporting metal plates 131 to which the lid 151 and the display 101 are fixed are fixed to the body case 111 with the screws 181, so that the width of the chassis is increased by the formation areas of the screw holes 113. Generally, this configuration is preferable because it is less necessary to reduce the width of the chassis on the upper and lower frames. The width of the chassis may be reduced using the fixing brackets as on the right and left frames, which will be described later.

The following will describe the chassis assembly of the right frame. The fixing bracket 141 is U-shaped in cross section in the horizontal direction by bending, to the front, the outer end (right end) of a rectangular metal sheet having long sides in the vertical direction and bending the inner end (left end) to the front. In the chassis assembly for the display apparatus according to the first embodiment, the laterally supporting metal plate 121 attached to the display 101 is positioned in contact with the inside of the long groove 112 on the rear end of the right side of the body case 111. As has been discussed, on the laterally supporting metal plate 121, the screw holes 122 are formed inside the right and left ends of the display 101. The fixing flat portion 143 of the fixing bracket 141 is inserted into the long groove 112 of the body case 111. Further, the laterally supporting metal plate 121 is positioned in contact with the inner end of the fixing bracket 141. In this configuration, inside dimensions between the outer end and the inner end of the fixing bracket 141 are slightly larger than a combined width of the bent end face 124 and the screwing flat portion 123 (see FIG. 2) on the rear end of the laterally supporting metal plate 121. In this state, the screw hole 142 is formed at a position corresponding to the screw hole 122 of the laterally supporting metal plate 121 on the fixing bracket 141 and a screw 171 penetrates the screw hole 152 of the lid 151 and the screw hole 142 of the fixing bracket 141 and is screwed into the screw hole 122 of the laterally supporting metal plate 121, so that the fixing bracket 141 is held between the laterally supporting metal plate 121 and the lid 151.

In FIG. 5, the fixing bracket 141 holds the long groove 112 of the body case 111 and the laterally supporting metal plate 121, so that the body case 111, the display 101, and the lid 151 are firmly fixed to one another. Further, the screw 171 can be disposed on the back side of the display and thus the body case 111 does not need a space for assembly, so that the chassis can be configured with the right and left chassis peripheral parts having small widths.

As has been discussed, the supporting metal plates are attached to the sides of the display, so that the screwing flat portions of the supporting metal plates are placed out of the back side of the display. Further, the lid, the fixing brackets, and the screwing flat portions are fixed with the screws in a state in which the fixing flat portions of the fixing brackets are inserted into the long grooves on the side walls of the body case, thereby reducing clearances between the display and the side walls of the body case. Thus with the simple chassis configuration having only the long grooves formed on the body case, the chassis can be constructed detachably with a chassis peripheral part having a small width.

In the first embodiment, the chassis is configured thus to reduce the widths of the right and left chassis peripheral parts. It is needless to say that the upper and lower peripheral parts of the chassis can be reduced in width by switching the vertical and horizontal configurations and using the fixing brackets 141 in the vertical direction. By using the fixing brackets 141 both in the vertical and horizontal directions, the upper, lower, right, and left chassis peripheral parts can be reduced in width. In other words, any of the peripheral parts can be reduced in width.

Moreover, the fixing bracket 141 is U-shaped (see FIG. 3B) in cross section in the horizontal direction by bending the inner end of the fixing bracket 141 to the front. The fixing bracket 141 may be L-shaped (see FIG. 3A) in cross section in the horizontal direction without bending the inner end, and the long groove 112 of the body case 111 and the laterally supporting metal plate 121 may be held by fastening with the screw 171.

The illustrated embodiments are to be considered exemplary and not limiting, and that the invention is defined by the claims that follow.

What is claimed is:

1. A chassis assembly for a display apparatus, comprising:
   a body case having side walls with rear faces and long grooves formed on the rear faces, the long grooves extending along a longitudinal direction of the side walls;
   a lid detachably fixed to the rear faces of the side walls of the body case;
   supporting metal plates attached directly on sides of a display and having bent end faces formed at rear ends of the supporting metal plates, the bent end faces being parallel to a display surface plane of the display;
   screwing flat portions provided on the supporting metal plates and protruded behind the display;
   fixing brackets contacting the bent end faces and having fixing flat portions in a shape of a flat plate projecting in a direction substantially perpendicular to the display surface plane of the display, the fixing flat portions being inserted into the long grooves; and
   a display fixing screw for integrally fixing the lid, the fixing bracket, and the screwing flat portion.

2. A chassis assembly for a display apparatus, comprising:
   a body case having lateral side walls with rear faces and long grooves formed on the rear faces, the long grooves extending along a longitudinal direction of the side walls;
   a lid detachably fixed to the rear faces of the side walls of the body case;
   supporting metal plates attached directly on sides of a display and having bent end faces formed at rear ends of the supporting metal plates, the bent end faces being parallel to a display surface plane of the display;
   screwing flat portions provided on the supporting metal plates and protruded behind the display;
   fixing brackets contacting the bent end faces and having fixing flat portions in a shape of flat plate projecting in a direction substantially perpendicular to the display surface plane of the display, the fixing flat portions being inserted into the long grooves; and
   a display fixing screw for integrally fixing the lid, the fixing bracket, and the screwing flat portion.

3. The chassis assembly for a display apparatus according to claim 1, wherein the long groove has a depth direction substantially corresponding with a direction substantially perpendicular to the display surface plane of the display.

4. The chassis assembly for a display apparatus according to claim 2, wherein the long groove has a depth direction substantially corresponding with a direction substantially perpendicular to the display surface plane of the display.

5. The chassis assembly for a display apparatus according to claim 1, wherein the fixing bracket further includes a second supporting flat portion formed to position the supporting metal plate, at a position opposed to the fixing flat portion of the fixing bracket.

6. The chassis assembly for a display apparatus according to claim 1, wherein the fixing flat portion includes protrusions on a surface of the fixing flat portion.

7. The chassis assembly for a display apparatus according to claim 1, wherein the side wall of the body case on which the long groove is formed includes steps.

8. The chassis assembly for a display apparatus according to claim 1, wherein the body case and the lid are fixed with a chassis fixing screw.

* * * * *